3,437,164
BATTERY SUPPORT DEVICE FOR POWER-OPERATED VEHICLES AND THE LIKE
Rodney R. Rabjohn, 9850 Stanwin Ave.,
Pacoima, Calif. 91331
Filed Feb. 14, 1966, Ser. No. 527,295
Int. Cl. B62d 25/00; H01m 1/04; B611 3/00
U.S. Cl. 180—68.5                                    9 Claims

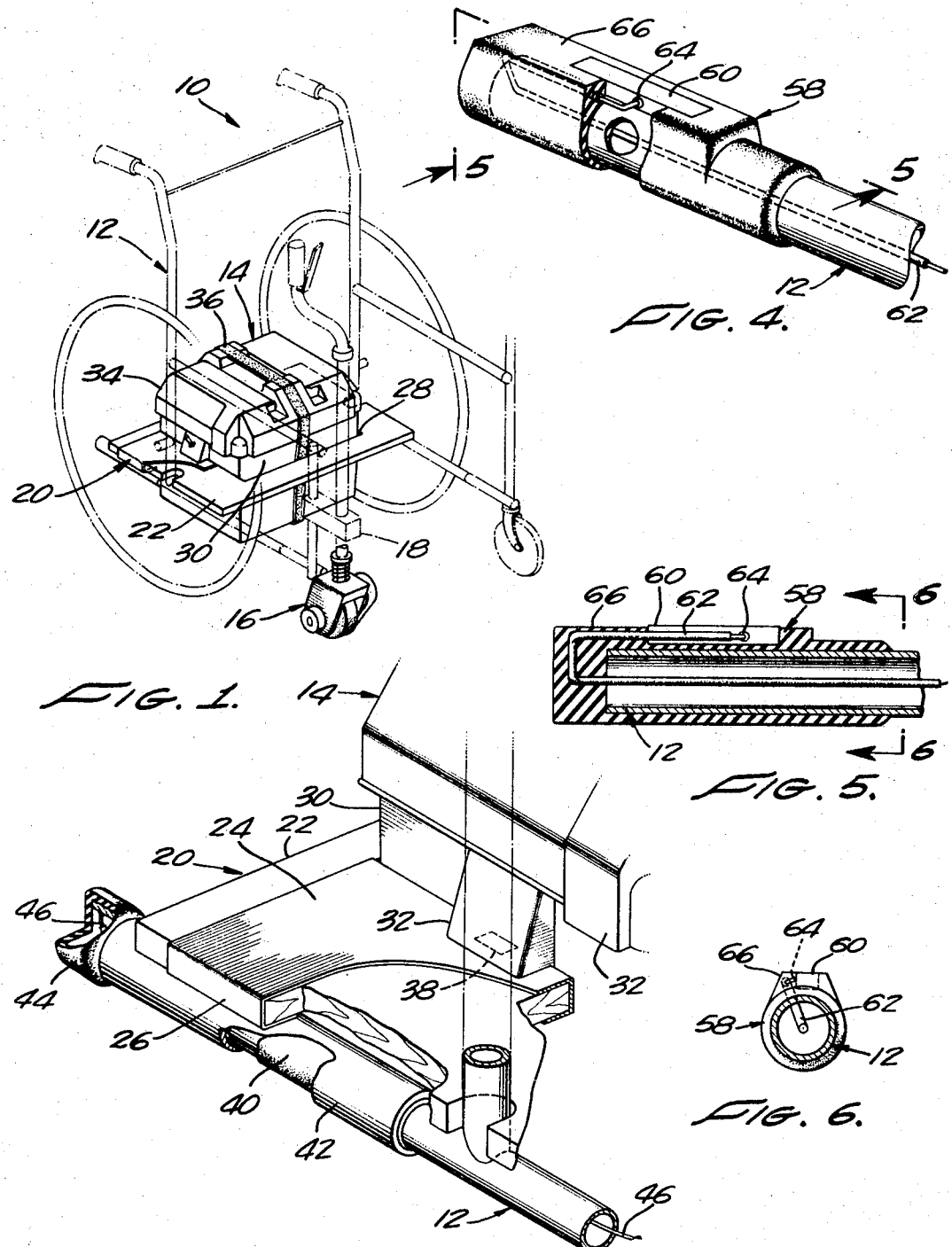

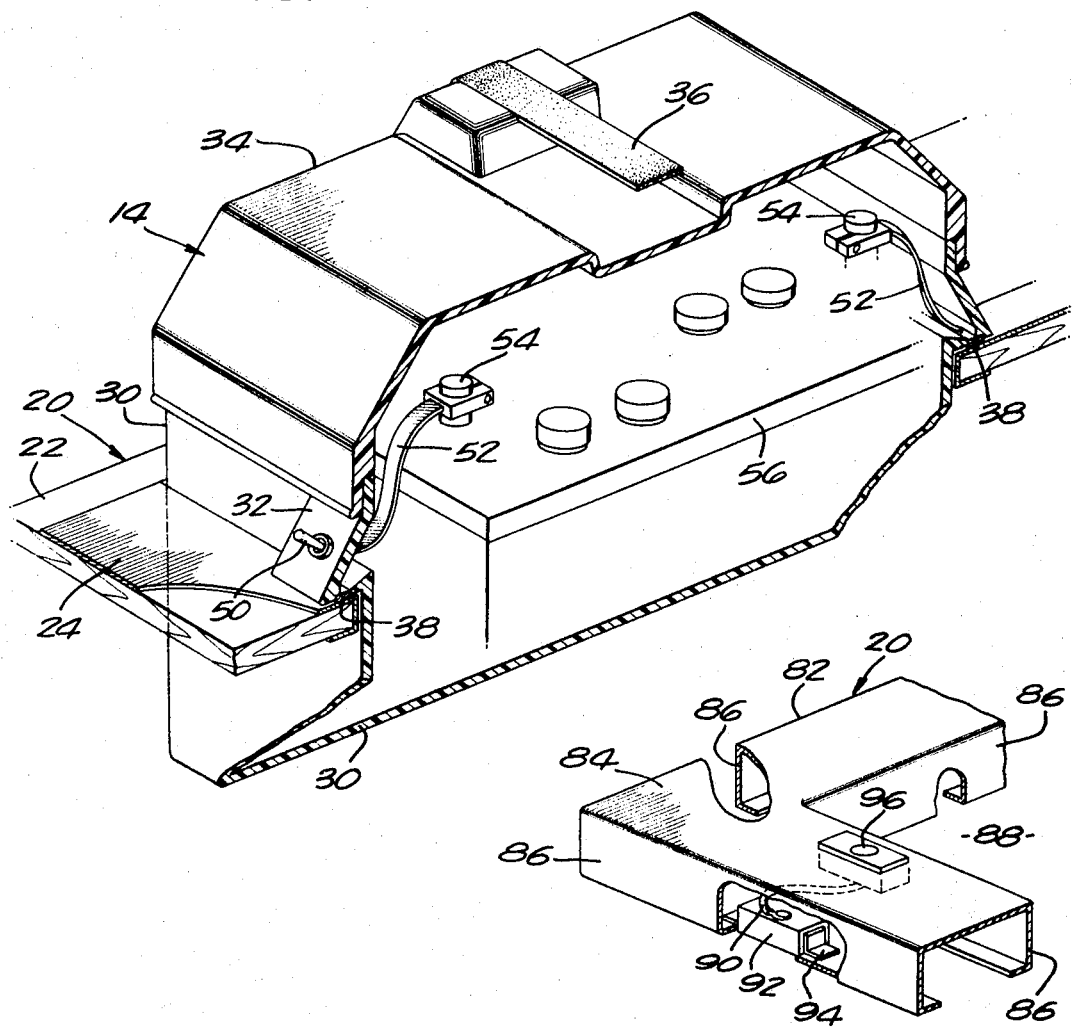
FIG. 3.
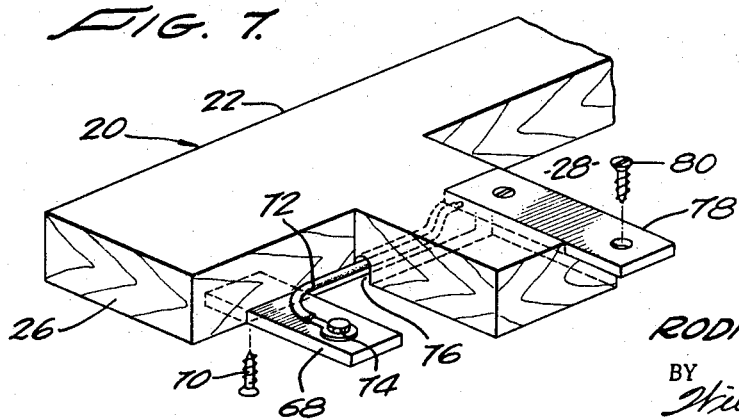
FIG. 7.
FIG. 8.
INVENTOR.
RODNEY R. RABJOHN
BY
William B. Everett
AGENT

United States Patent Office 3,437,164
Patented Apr. 8, 1969

ABSTRACT OF THE DISCLOSURE

A battery support device for vehicles in which a storage battery is used as the source of electrical power. The battery is carried in a covered container with the terminals connected to two tab-like support brackets. When properly mounted in its support member, the support brackets contact the support member and establish circuit continuity. The support member in turn may also be removably mounted in the frame of the vehicle and hence likewise completes the electrical circuit when properly positioned, this choice becoming a requirement in wheelchairs of the foldable type. In order that all exposed parts of the vehicle frame be tied to ground potential, a nonconductive sleeve having an electrically isolated terminal plate embedded therein is provided for completing the circuit to the battery terminal other than the ground potential terminal.

---

This invention relates to apparatus for power-operated vehicles and the like and more particularly to a novel battery support bracket and circuit converting means for such vehicles.

The widespread usage of power-operated vehicles for both individual transportation and industrial purposes is well known today. In most of these power-operated vehicles, storage batteries are used suitably arranged to drive a direct current motor of predetermined voltage and current ratings. In these cases, the energy consumed during daily operation can be restored as by charging which could be done during the night hours when the vehicle is not in use. However, in some types of vehicles, as well as in some type of operation or use of virtually any such power-operated vehicle, this out-of-operation time for service reasons represents time lost and hence lost revenue which can never be made up. Such expenses simply cannot be reconciled on any basis.

With the present invention, these lost revenues and/or unnecessary expenses are forever eliminated. When the storage batteries need charging, all that is required is to quickly exchange the exhausted battery for one freshly charged and the vehicle is back in service while the exhausted battery is being restored to a useful state. And, as a result of this sort of time sharing the vehicle with various storage batteries, it is now possible to slowly charge the depleted battery instead of resorting to a high current, quick charge. The advantages of the former over the latter in terms of performance, useful life, etc. are well known.

And as a further and significantly more important result, it is now economically feasible to provide not only a power-operated wheel chair using a storage battery that can be quickly exchanged or removed for charging purposes but also folding type wheel chairs, heretofore limited to manually powered operation by an attendant or by patients strong enough and/or with fairly good control in the use of their arms and hands, can now be equipped for power type operation. A power-operated wheel chair which may be of the foldable type and which utilizes one embodiment of the present invention is disclosed in a copending patent application filed Feb. 14, 1966, Ser. No. 527,029.

One of the main benefits derived in using the present invention on power-operated vehicles including wheel chairs, whether of the foldable type or not, is that the initial investment is considerably less since few vehicles of the chosen type are needed simply because the utilization factor has been substantially increased. More storage batteries may be required but the savings in a trade-off in batteries for vehicles could vary widely and in some cases have far reaching effects.

Another advantage of the invention centers on the fact that after the storage battery is removed from the support device of the invention, the further removal of the support device itself provides additional room for a mechanic to service whatever mechanism might happen to be mounted directly below the storage battery. In slightly different terms, the space directly below the storage battery, which might otherwise not be used simply because it is too difficult or inconvenient to get at that space, can now be used. In many cases this permits efficient lay-out of parts and provides a neat looking package without making it difficult for the individual servicing the vehicle.

With the present invention, no longer would it be possible to install a storage battery with the terminals reversed because each installation is properly polarized. In addition, that terminal other than the one connected to the frame of the vehicle may in turn be connected to a suitable circuit breaker for assuring fail-safe operation at all times. In each vehicle utilizing the present invention, provisions are included to assure that at no place on the vehicle is it possible to establish a conductive path between the terminals of the storage battery.

Briefly, the invention comprises a support member having an opening for receiving a covered container having a plurality of handle-like protrusions which extend outwardly from the container and engage the support member when the container is disposed in the opening. A storage battery is carried in the container, and the terminals of the battery are connected to the cables provided in the container. Each cable terminates at an external contact plate provided on certain ones of the handle-like protrusions. A combination ON-OFF switch with circuit breaker may be mounted on one of the protrusions and serially connected between the associated contact plate and the corresponding cable.

The support member includes similar contact plates disposed about the opening and in alignment with the contact plates on the container. If desired, the contact plates on the support member can be positioned in some predetermined way and the handle-like protrusion on the battery container similarly disposed so that circuit continuity can be established only by placing the battery container correctly oriented in the opening.

Where the present invention is used on vehicles formed from tubular stock, a sleevelike adapter is provided which can be easily slipped on the supporting tubular frame and positioned to properly contact the supporting member to complete the electrical connection and yet still not expose any part having voltage potential other than the frame of the power-operated vehicle.

It is therefore a primary objective and purpose of the invention to provide a novel battery support device for power-operated vehicles and the like.

It is another object of the invention to provide a battery support apparatus for power operated vehicles which can be readily removed without hard tools of any kind.

It is still another object of the invention to provide a battery support device for power operated vehicles of the type described wherein fail-safe operation is provided.

It is yet another object of the invention to provide a battery support device for power-operated vehicles of the type described having provision for enclosing the storage battery in a container having electrical contact terminals suitably polarized.

Another object of the invention is to provide a battery support apparatus for power-operated vehicles of the type described having provisions for mounting the battery support device on a tubular frame without requiring any modifications to the frame.

Still another object of the invention is to provide a battery support apparatus for power-operated vehicles of the type described having provisions for concealing and electrically isolating all parts having a voltage potential other than that of the power operated vehicle.

Other objects, features and advantages of the invention will appear and be brought out more fully in the following specification reference being had to the accompanying drawing wherein:

FIGURE 1 is a perspective view of the invention shown operatively disposed on a power operated wheel chair of either the fixed or foldable type.

FIGURE 2 is an enlarged partial perspective view of a portion of the invention shown in FIGURE 1 and showing an insulating sleeve for mounting the invention on a tubular frame structure.

FIGURE 3 is an enlarged cross-sectional view in perspective of another portion of the invention shown in FIGURE 1 and showing in phantom a storage battery operatively disposed in the enclosed container.

FIGURE 4 is a perspective view of another embodiment of an insulating sleeve adapter for installing the invention on tubular devices. A portion of the insulating material is shown removed for descriptive purposes.

FIGURE 5 is a cross-sectional view of the insulating sleeve taken along the line 5—5 of FIGURE 4.

FIGURE 6 is a cross-sectional view of the insulating sleeve of FIGURE 4 taken along the line 6—6 of FIGURE 5.

FIGURE 7 is a partial perspective view of another embodiment of the battery support member of FIGURE 1, portions of the wood material being removed to show the electrical connections between the contact members.

FIGURE 8 is a partial perspective view of a third embodiment of the battery supporting member shown in FIGURES 1, 2 and 3, portions of the sheet metal being shown as removed for purposes of illustration.

According to the invention, there is provided in a power-operated vehicle of the type including a direct current motor and a storage battery, an apparatus comprising a battery supporting device for the vehicle, the apparatus comprising in combination means forming an enclosure for the battery and including a container having outwardly extending tab-like protrusions disposed along the side thereof, certain ones of the protrusions having recessed contact plates, and cable means extending from each of the contact plates and including clamp means for attachment of the cable means to one of the terminals of the storage battery; and means removably supported by the vehicle and including a support member having an opening for receiving the container and conductive means disposed on the member in aligning relationship with the protrusions of the container for providing a conductive path between the storage battery and the direct current motor.

Referring now to the drawing, shown there in FIGURE 1 in perspective is a battery support apparatus or device 20 according to the invention. The device 20 is shown installed on a conventional wheel chair 10 having a frame 12 to which a motor drive and control assembly 16 is attached by means of a bracket 18. A power source 14 is provided for operating the motor drive and control assembly and is operatively supported by the device 20.

As best seen in FIGURES 2 and 3, the apparatus or device 20 includes a support member 22, for which plywood may be used, having a conductive member 24 as for example a sheet-like metal element shown disposed over the upper surface between each opposing end 26 and the corresponding sides of an opening 28.

The opening 28 is sufficiently large to receive a container 30 having tab-like protrusions 32 which extend outwardly and over the support member 22 and prevent the container 30 and its contents from falling through the opening 28. A cover 34 may be provided for the container 30 and held in place by a belt 36 which may also serve as a handle for carrying the container 30 or positioning it in or out of the opening 28. The protrusions 32 are provided with a contact plate 38 which selectively engage the conductive member 24 in electrical contact relationship for reasons to be described.

The frame 12 in FIGURE 2 is shown made from conventional tubular stock, as is the common practice. If desired, the support member 22 which is supported by the frame 12 may be contoured around any upstanding tubular sections to restrict movement in two orthogonal directions and hence maintain the initial positioning of the support member. Although only one horizontally disposed tubular section of the frame 12 is shown, it is to be understood that a similar parallel tubular section is available at the other end 26 and is likewise supporting the member 22 with the conductive member 24 disposed, in electrical contact relationship with the frame 12.

As for the end 26 shown in FIGURE 2, the conductive member 24 is disposed in electrical contact relationship with a conductive tube 42 having an insulated sleeve 40 which is pressed over the outer end of the tubular frame 12. An insulated end cap 44 is provided over the outer end of the tube 42 which may extend outwardly beyond the sleeve 40 and the outer end of the frame 12. With this arrangement, a conductor 46 may be attached to the tube 42 at a soldered joint 48. The other end of the conductor 46 may be coupled to the motor drive and control assembly 16 to provide an operable power-operated vehicle, which as shown here in FIGURE 1, takes the form of a power-operated wheel chair. For more information on the motor drive and control assembly reference is made here to my copending application for Letters Patent entitled Power Operated Wheel Chair, Ser. No. 527,029, filed Feb. 14, 1966. For purposes here of describing the invention, it should be pointed out that the voltage between the conductor 46 and the frame 12 is representative of the maximum voltage available at the input of the motor drive and control assembly 16.

In FIGURE 3, the protrusion 32 shown at the left includes a switch 50 which may be serially connected between the contact plate 38 and the corresponding one of the straps 52 which in turn are suitably clamped to the battery terminals 54 of a storage battery 56. The switch 50 may be a combination ON-OFF switch and protective circuit-breaker to assure fail-safe operation at all times.

It should be noted, that the cover 34 further enhances the safety aspects of the invention by preventing contact not only with acids, etc., but also preventing accidentally shorting of the terminals of the battery 56. The cover 34 need be removed only when servicing the battery 56 as by checking the level of the electrolyte or when replacing a different battery 56 in the container 30. By providing a similarly arranged support member 22 on a recharging device, the battery 56 could be recharged without being disturbed in the container 30.

In FIGURE 4, there is shown an alternate embodiment for electrically connecting the conductor 46 of FIGURE 2 to the conductive member 24 and yet maintaining electrical isolation between the conductive member 24 and the frame 12.

The alternate embodiment of FIGURE 4 comprises a sleeve 58 of insulative materials which may be moulded with one end closed and with the outer surface of a metal plate 60 flush with a raised flat surface portion 66 on which the support member 22 would rest and establish electrical contact between the metal plate 22 and the conductive member 24. A conductor 62, which in all respects is equivalent to the conductor 46 of FIGURE 2, is provided in electrical contact as by a soldered joint 64 with the metal plate 60.

The conductor 62 as shown in FIGURES 4, 5 and 6 extends from the plate 60 towards the closed end, or to the left as seen in FIGURE 5, and radially toward the center of the tubular frame 12 and ultimately emerges from the insulating sleeve 58 in the center regions of the tubular frame 12 on which the sleeve 58 is pressed. In this way, a fully concealed and electrically isolated conductive path via the conductor 62 is provided.

In FIGURES 7 and 8 are shown two additional embodiments of the support member 22 of FIGURES 1, 2 and 3. In FIGURE 7, the same material, namely wood or plywood, is used only here a contact plate 68 is recessed in the bottom surface of the support member 22 and attached thereto by wood screws 70. A conductor 72 connected by a fastener 74 to the contact plate 68 extends in a groove 76 which extends along the bottom surface of the support member 22 towards the opening 28. The conductor 72 may be similarly attached to a contact plate 78 which may also be recessed in the upper surface of the support member 24 and fastened thereto by wood screws 80. The other side opposite the end 26 may be made in precisely the same manner.

In FIGURE 8, a support member 82 of sheet metal construction is provided where the wood support member 22 is deemed undesired. The support member 82 includes a top surface 84 and downwardly extending sides 86. An opening 88 similar to the opening 28 is provided. A wire conductor 90 extends between two fiber blocks 92, each suitably held in place by a metal clip 94 and each including a contact plate 96. The contact plates 96 of FIGURE 8 are similar in all respects to the contact plates 68 and 78 of FIGURE 7.

Thus, when either the alternate embodiments of the support member 22 are used in conjunction with the insulative sleeve 58 of FIGURES 4, 5 and 6, it can be seen that none of the parts of the apparatus 10 which of necessity are at a voltage potential other than the frame 12 is exposed and available for contact or possible short circuiting to the frame 12.

It should be pointed out that the protrusions 32 of the container 30 may be disposed in an off-center position with the conductive member 24, or the contact plates 78 and the corresponding contact plate 96 of FIGURE 8, aligned accordingly. With this arrangement, circuit continuity to the battery 56 is established only when the container 30 is properly oriented before placement in the opening 28. Another position would result in the contact plates 38 failing to make electrical contact with the appropriate conductive member 24. It is important then, that the battery 56 be properly positioned in the container 30 to assure the desired voltage polarity at the proper contact plate 38. But, this need concern only reliable service personnel; any accidenal or otherwise misplacement of the container 30 in the opening 28 merely results in a non-operative state producing no ill effects nor endangering the individual user. The device 10 assures failsafe operation at all times.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

I claim:

1. In a power-operated vehicle having a frame formed of conductive materials and including a direct current motor and a storage battery, an apparatus comprising a battery supporting device for said vehicle, said apparatus comprising in combination:

means forming an enclosure for said battery and including a container having outwardly extending tablike protrusions disposed along the side thereof, certain ones of said protrusions having recessed contact plates, and cable means extending from each of said contact plates and including clamp means for attachment of said cable means to one of the terminals of said storage battery; and means removably supported on said frame and including a support member having an opening for receiving said container and conductive means disposed on said member in aligning relationship with the protrusions of said container, one end of said support member being in electrical contact relationship with said frame and the other end of said support member having means for providing a conductive path between said storage battery and said direct current motor and for electrically isolating said conductive means from said frame.

2. The apparatus in accordance with claim 1 further characterized in that said electrically isolating means disposed at said other end of said support member comprises a first layer of nonconductive material surrounding said frame in the region of said other end of said support member, a second layer of conductive material surrounding said first layer, and an insulated conductor fastened to said second layer and to one terminal of said motor, the other terminal thereof being connected to said frame.

3. The appaartus in accordance with claim 2 further characterized in that said conductive means comprises a metallic sheet disposed along the upper surface of said support member over predetermined portions thereof from said opening to said end in contact relationship with said frame and to said other end in contact relationship with said second layer of conductive material.

4. The apparatus in accordance with claim 3, further characterized in that said container includes a removable cover and belt means for retaining said cover on said container and for providing means for removing said container with battery enclosed from said support member for maintenance purposes and for removing said removable support member.

5. The apparatus in accordance with claim 2 further characterized in that said support member is formed from wood and said conductive means comprises a wire conductor extending along the bottom surface of said support member in a groove disposed therein, said wire conductor terminating at one end thereof with said contact plates disposed near said opening and at the other end with contact plates disposed in alignment with the conductive portions of said electrically isolating means disposed on said frame at said other end of said support member.

6. The apparatus in accordance with claim 5 further characterized in that said container includes a removable cover and belt means for retaining said cover on said container and for providing means for removing said container with battery enclosed from said support member for maintenance purposes and for removing said removable support member.

7. The apparatus in accordance with claim 2 further characterized in that said support member comprises a metal stamping and said conductive means comprises a wire conductor extending along the bottom surface of said support member in a groove disposed therein, said wire conductor terminating at one end thereof with said contact plates disposed near said opening and at the other end with contact plates disposed in alignment with the conductive portions of said electrically isolating means disposed on said frame at said other end of said support member.

8. The apparatus in accordance with claim 7 further characterized in that said container includes a removable cover and belt means for retaining said cover on said container and for providing means for removing said container with battery enclosed from said support member for maintenance purposes and for removing said removable support member.

9. The apparatus in accordance with claim 1 further characterized in that said conductive frame is tubular in cross-section and in that said electrically isolating means comprises a sleeve of insulative materials having a longitudinal flat surface portion, a conductive plate partially imbedded in said insulative material along said flat surface portion, and an insulated conductor fastened at one end to said conductive plate and to said motor at the other end, said conductive plate being in electrical contact relationship with said other end of said support member.

References Cited

UNITED STATES PATENTS

| | | | |
|---|---|---|---|
| 544,430 | 8/1895 | Froggatt | 180—68.5 X |
| 1,138,122 | 5/1915 | Lambert et al. | 180—68.5 |
| 2,705,254 | 3/1955 | Middleton | 180—68.5 X |
| 2,879,858 | 3/1959 | Thomas | 180—65 X |
| 3,023,825 | 3/1962 | Rabjohn | 180—65 X |

BENJAMIN HERSH, *Primary Examiner.*

MILTON L. SMITH, *Assistant Examiner.*

U.S. Cl. X.R.

105—51; 136—172